United States Patent [19]

de Jong et al.

[11] Patent Number: 5,810,686

[45] Date of Patent: Sep. 22, 1998

[54] DIVISIBLE SPROCKET WHEEL

[75] Inventors: Maximus Johanna Franciscus Maria de Jong, Massluis; George Johannes van Zijderveld, 's-Gravenzande, both of Netherlands

[73] Assignee: MCC Nederland B. V., Netherlands

[21] Appl. No.: 688,683

[22] Filed: Jul. 26, 1996

[30] Foreign Application Priority Data

Jul. 31, 1995 [NL] Netherlands ................... 1000907

[51] Int. Cl.$^6$ .................... F16H 55/12; F16H 55/06
[52] U.S. Cl. ................. 474/96; 474/95; 474/161
[58] Field of Search ............... 474/95, 96, 152, 474/161

[56] References Cited

U.S. PATENT DOCUMENTS

| | | | |
|---|---|---|---|
| 1,359,842 | 11/1920 | Sandberg | 474/95 |
| 1,363,772 | 12/1920 | Gilbert | 474/95 |
| 3,666,322 | 5/1972 | Pickron | 474/161 |
| 3,789,687 | 2/1974 | Cutter | 474/152 |
| 4,506,559 | 3/1985 | Francke et al. | 474/95 |
| 4,527,839 | 7/1985 | Fujitaka et al. | 301/63 |
| 4,832,414 | 5/1989 | Jones | 301/63 |
| 4,964,842 | 10/1990 | Howard | 474/152 |
| 5,037,356 | 8/1991 | Gladczak et al. | 474/95 |
| 5,271,287 | 12/1993 | Wadleigh | 74/439 |
| 5,295,917 | 3/1994 | Hannum | 474/95 |
| 5,322,478 | 6/1994 | Bos et al. | 474/95 |
| 5,378,203 | 1/1995 | Baebal | 474/96 |

FOREIGN PATENT DOCUMENTS

| | | |
|---|---|---|
| A 2 339 111 | 8/1977 | France . |
| A 42 06 129 | 9/1993 | Germany . |
| A 57 190158 | 11/1982 | Japan . |

*Primary Examiner*—Tamara L. Graysay
*Assistant Examiner*—Gary S. Hartmann
*Attorney, Agent, or Firm*—Varnum, Riddering, Schmidt & Howlett LLP

[57] ABSTRACT

The invention relates to a divisible sprocket wheel manufactured from synthetic material and having a gear ring (1b) and a hub portion (1a), comprising two wheel halves (1) which are manufactured by means of injection molding and have their axial faces (1f) abutting against each other, and means (3, 4) for enabling fixing the wheel halves together, wherein each wheel half (1) is solid and consists of a first synthetic material forming at least one half of the hub portion of the sprocket wheel; a second synthetic material forming at least one half of the gear ring of the sprocket wheel and the two radial outer faces (1d, 1e) of the wheel half, and a third synthetic material forming the internal portion (1e) of the body of the wheel half.

5 Claims, 2 Drawing Sheets

DIVISIBLE SPROCKET WHEEL

BACKGROUND OF THE INVENTION

1. Field of the Invention

The present invention relates to a divisible sprocket wheel manufactured from synthetic material and having a gear ring and a hub portion, comprising two wheel halves which are manufactured by means of injection molding and have their axial faces abutting against each other, and means for enabling fixing the wheel halves together.

2. Background Art

Such a sprocket wheel is disclosed in EP-A-0561478 and has as an advantage that in the case where several sprocket wheels are present side by side on a shaft, as is often the case with chain conveyors, replacement of one of the sprocket wheels can take place without all or at least a number of the wheels having to be removed from the shaft first, and without the wheel-carrying shaft having to be taken from its bearings.

The known divisible sprocket wheels which are manufactured by means of injection molding have the drawback that the cavities and ribs, characteristic of the injection molding process, easily take up dirt. Especially in the last few years this has increasingly been considered a problem, because the dirt caked on the sprocket wheel is difficult to remove and prevents a hygienic production. Particularly now that today, in the production of foodstuff, attempts are made to use fewer and fewer preservatives, it is of course desired to strive for optimum hygiene in the transport lines for such products, which is not possible if the sprocket wheels utilized in a transport or packing/filling line are easily fouled and hard to clean.

DE-A-4206129 describes a sprocket wheel whose wheel halves are solid and manufactured through a cutting operation from solid material. Such a sprocket wheel is easy to clean, but has the drawback of a high cost price.

In the sprocket wheel described in EP-A-0561478, which is manufactured by means of injection molding, each wheel half consists of two parts abutting against each other by a radial side face and attached to each other. Owing to this measure, the cavities and ribs which are necessarily present because of the injection molding process, can be located in the interior of the wheel half. However, in practice, this known wheel proved to be very difficult to manufacture.

SUMMARY OF THE INVENTION

It is an object of the invention is to provide a divisible sprocket wheel manufactured through injection molding, which is on the one hand cheap to manufacture and on the other hand insusceptible to fouling and also easy to clean.

To this end, the invention provides a sprocket wheel of the type mentioned hereinabove, characterized in that each wheel half is solid and consists of a first synthetic material forming at least one half of the hub portion of the sprocket wheel; a second synthetic material forming at least one half of the gear ring of the sprocket wheel and the two radial outer faces of the wheel half, and a third synthetic material forming the internal portion of the body of the wheel half.

The axial face of each wheel half may consist of the same material as the hub portion, but preferably consists of the same material as the gear ring portion.

Through the features according to the invention, the advantages of a solid sprocket wheel, the good hygienic properties and the firmness, can be combined with the advantages of manufacturing a sprocket wheel through injection molding, a low cost price. In accordance with the invention, for injection molding the sprocket wheel, a so-called 3-component injection molding machine is preferably used, whereby the three different types of synthetic material can be injected into one die. Consequently, for the hub portion, the material which is most suitable therefor can be used, for instance a glass-fiber reinforced synthetic material, preferably polyamide, which has the advantage of being very strong. The gear ring and the outer faces can be molded from a relatively soft and tough synthetic material which is wear resistant and is noise-low; for this, a non-modified polyamide can be used. Finally, the interior of each of the wheel halves can be injected so as to be solid by means of a (recycled) synthetic waste material. The thus produced wheel has a low cost price, is solid and hence hygienic, and has as a whole, through the choice of different materials for the gear ring and the hub portion, better properties than a sprocket wheel produced by means of milling from one single solid material.

It is observed that FR-A-2339111 discloses a solid guide wheel for chains or cables, which is not divisible but whose hub portion consists of a material, for instance a natural or synthetic rubber, different from the rest of the wheel, which is manufactured from high-density polyethylene (UHMWPE). The hub portion is connected to the polyethylene through vulcanization. This guide wheel, too, has the drawback of a high cost price and is not divisible.

As an example, it can be indicated that in a sprocket wheel according to the invention, 60% of the total weight of synthetic material may consist of the cheap, recycled synthetic waste material, so that the more expensive material needs to be used for only 40% of the sprocket wheel, while this is nowhere visible on the outside of the wheel and does not prove to have any adverse effects on the mechanical properties.

Obviously, instead of using a 3-component injection molding machine, a part of the sprocket wheel can also be injected into a 2-component injection molding machine, and the rest into a conventional injection molding machine of one component. It is even possible to inject each of the three different synthetic materials into three separate conventional injection molding machines in successive steps.

BRIEF DESCRIPTION OF THE DRAWING

Hereinafter, the invention will be specified on the basis of an exemplary embodiment with reference to the accompanying drawings, wherein.

DETAILED DESCRIPTION

The Figures clearly demonstrate in which manner the sprocket wheel according to the invention, consisting of a wheel half 1 and a wheel half 2, is built up.

Figure 1:
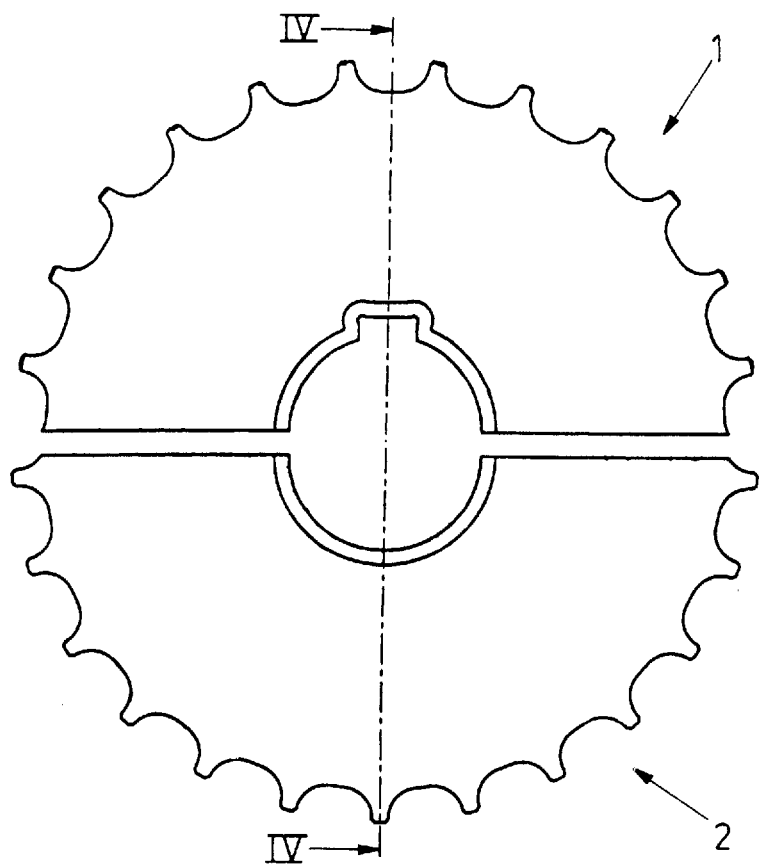
FIG. 1 is a side elevation of the sprocket wheel according to the invention.
Figure 2:
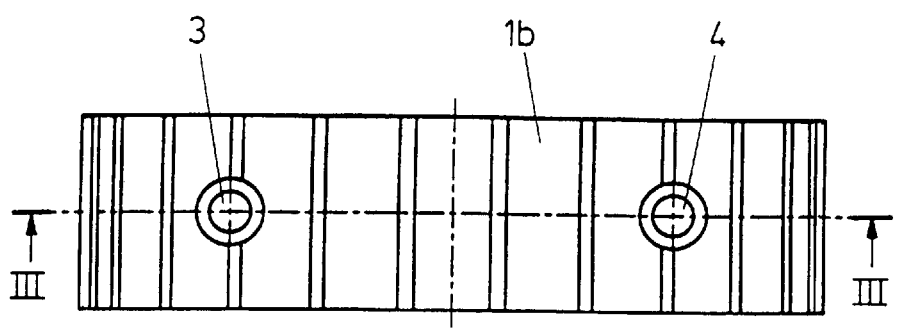
FIG. 2 is a top plan view of the sprocket wheel according to the invention.
Figure 3:
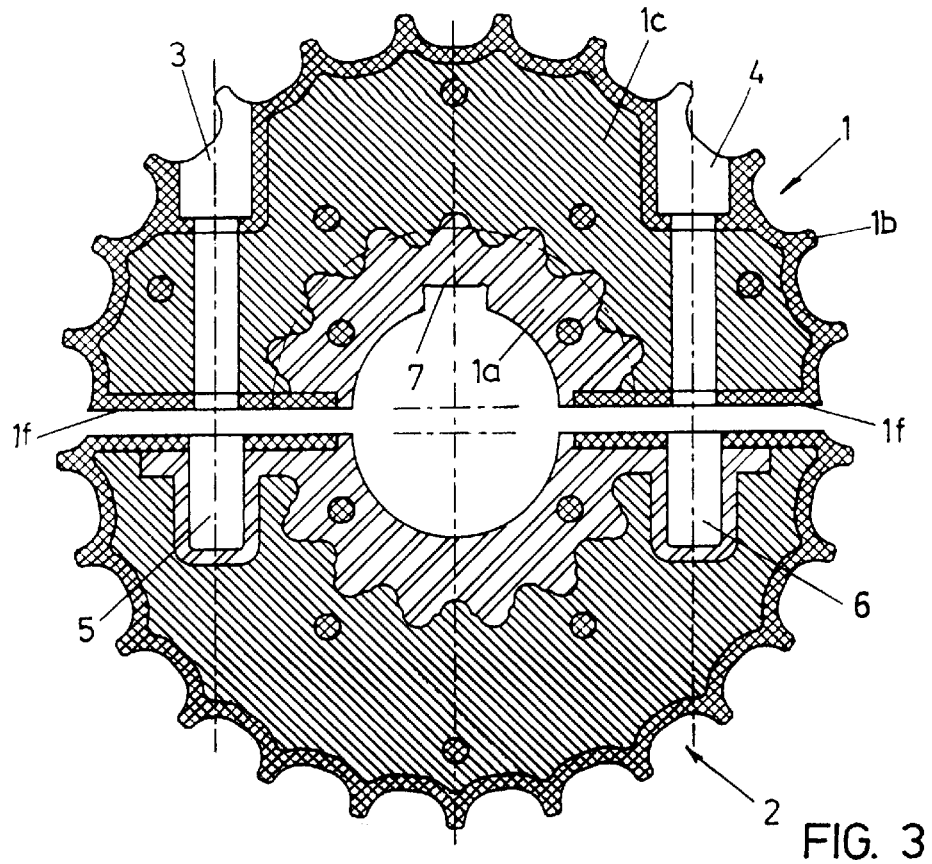
FIG. 3 shows a section along the line III—III in FIG. 2.
Figure 4:
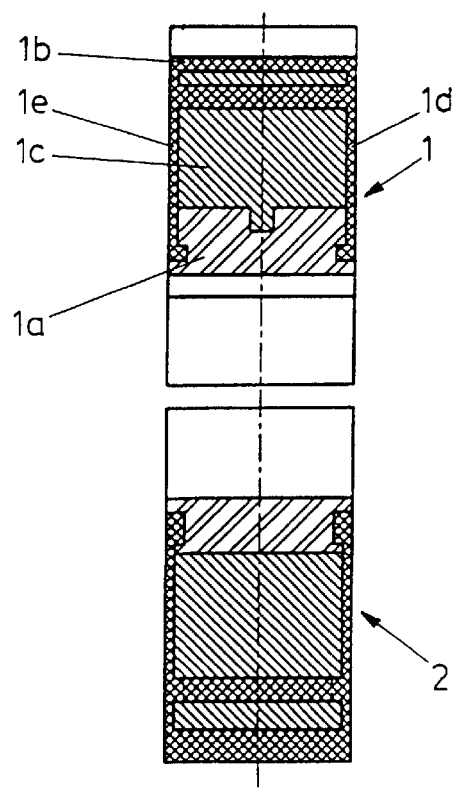
FIG. 4 shows a section along the line IV—IV in FIG. 1.

As is clearly shown in FIG. 3, wheel half 1 consists of a hub portion 1a, manufactured from a first synthetic material, for instance a glass-fiber reinforced synthetic material, preferably a glass-fiber reinforced polyamide, and a gear ring 1b manufactured from a synthetic material, preferably a non-modified polyamide, having optimum properties for guiding a chain, such as relatively soft and tough, so that a low noise production and a relatively low wear is realized. This synthetic material is also provided on the radial side faces 1*d* and 1*e* of the wheel half 1, as shown in FIG. 4, and on the axial side face 1*f*, as shown in FIG. 3. It is also possible to manufacture the axial side face 7*f* from the same material as the hub portion 1*a*. Instead of a polyamide, a different material suitable for injection molding can also be used for the gear ring 1*b* and the hub portion 1*a*, such as polybuteneterephthalate (PBT) or polyoxymethylene (POM).

The internal portion 1*c* of the wheel half is manufactured from a recycled synthetic material, preferably a recycled polyamide. Because the internal part may constitute about 60% of the total mass of the wheel, the cost price is favorably influenced through the use of the cheap recycled material.

The wheel half 1 is further provided with passages 3 and 4, wherein fastening members, such as bolts, can be received, which cooperate with nuts, not shown, provided in the other wheel half 2, to draw the two wheel halves against each other round a shaft. Preferably, the nuts in the wheel half 2 are accommodated in the wheel half as cast-in elements, so that only two, rather than four, openings are present along the gear ring. These openings can be closed by means of plugs or the like.

As FIG. 3 shows, the wheel half 2 is substantially identical to the wheel half 1, with the difference that instead of the through openings 3 and 4, cavities 5 and 6 are provided for receiving a fastening nut capable of cooperating with the fastening bolt inserted via the opening 3 or 4 respectively. Preferably, the walls of the cavities 5 and 6 are formed from the glass-fiber reinforced synthetic material from which the hub portion 1*a* is manufactured as well. For that purpose, the material preferably continues from the hub portion to at least beyond the cavities 5 and 6. To obtain the passages 3 and 4, the inner wall of these openings 3 and 4 can, if the axial side face if is manufactured from the same glass-fiber reinforced synthetic material as the gear ring portion 1*a*, also consist of the same glass-fiber reinforced synthetic material, rather than of the material used for the interior of the wheel half.

An advantage of using glass-fiber reinforced synthetic material for the hub portion is that the metal reinforcement element which is normally present in sprocket wheels at the location of the key way 7 can be omitted.

It will be readily understood by anyone skilled in the art that many modifications are possible within the framework of the invention, as long as the essence of the invention as described in the appended claims is used.

We claim:

1. A divisible sprocket wheel manufactured from synthetic material and having a gear ring and a hub portion, the sprocket wheel comprising;

first and second wheel halves which are manufactured by means of injection molding, each of the wheel halves comprising two radial outer faces and an axial face, the axial faces of the first and second wheel halves abutting against each other, and means for enabling fixing the wheel halves together, characterized in that each wheel half is solid and consists of a first synthetic material forming at least one half of the hub portion of the sprocket wheel, a second synthetic material differing in composition from the first synthetic materials and forming at least one half of the gearring of the sprocket wheel and the two radial outer faces of the wheel half, and a third synthetic material forming an internal portion of the body of the wheel half.

2. A sprocket wheel according to claim 1 wherein each wheel half comprises an axial side face and, characterized in that the axial side face of each wheel half consists of the same synthetic material as the gear ring.

3. A sprocket wheel according to claim 1, characterized in that the synthetic material for the hub portion is glass-fiber reinforced.

4. A sprocket wheel according to claim 1, characterized in that the synthetic material for the internal portion of the wheel half is a recycled synthetic material.

5. A sprocket wheel according to claim 3, characterized in that the synthetic material is a polyamide.

* * * * *